(12) United States Patent
Carsello et al.

(10) Patent No.: US 7,460,624 B2
(45) Date of Patent: Dec. 2, 2008

(54) METHOD AND SYSTEM OF REDUCING COLLISIONS IN AN ASYNCHRONOUS COMMUNICATION SYSTEM

(75) Inventors: Stephen R. Carsello, Plantation, FL (US); Bradley J. Rainbolt, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 668 days.

(21) Appl. No.: 10/803,325

(22) Filed: Mar. 18, 2004

(65) Prior Publication Data

US 2005/0207383 A1 Sep. 22, 2005

(51) Int. Cl.
*H03D 1/04* (2006.01)
*H04B 1/10* (2006.01)
*H04L 1/00* (2006.01)
*H04L 25/08* (2006.01)

(52) U.S. Cl. .................. 375/346; 375/344; 370/335; 370/337; 370/342

(58) Field of Classification Search ................ 375/346, 375/344; 370/337, 342, 335
See application file for complete search history.

(56) References Cited

U.S. PATENT DOCUMENTS

| 3,730,998 | A | * | 5/1973 | Schmidt et al. ............. 370/324 |
| 5,778,073 | A | | 7/1998 | Bushing et al. |
| 6,269,088 | B1 | * | 7/2001 | Masui et al. ................ 370/335 |
| 6,359,871 | B1 | * | 3/2002 | Chung et al. ................ 370/338 |
| 7,106,814 | B2 | | 9/2006 | Carsello |
| 2003/0223476 | A1 | | 12/2003 | Kanterakis et al. |
| 2004/0190652 | A1 | * | 9/2004 | Gamble et al. .............. 375/344 |

\* cited by examiner

*Primary Examiner*—Ted Wang

(57) ABSTRACT

A method (60 or 70) and system of reducing collisions in an asynchronous communication system can include the steps at a transmitter (200) of generating (61) a set of known preamble waveforms and transmitting (64) at least one distinguishable preamble waveform based on an association with a call type and a receiver identifier. The method (70) can also include the steps at a receiver (300) of receiving (71) at least one preamble waveform among a set of different preamble waveforms which toggle between two symbol frequencies, the different preamble waveforms being distinguishable by at least having one among a different symbol frequency spacing and a different symbol toggling duty cycle. The method further includes the step of selecting (73) to decode a preamble waveform based on at least one among the different symbol frequency spacing and the different symbol toggling duty cycle.

24 Claims, 5 Drawing Sheets

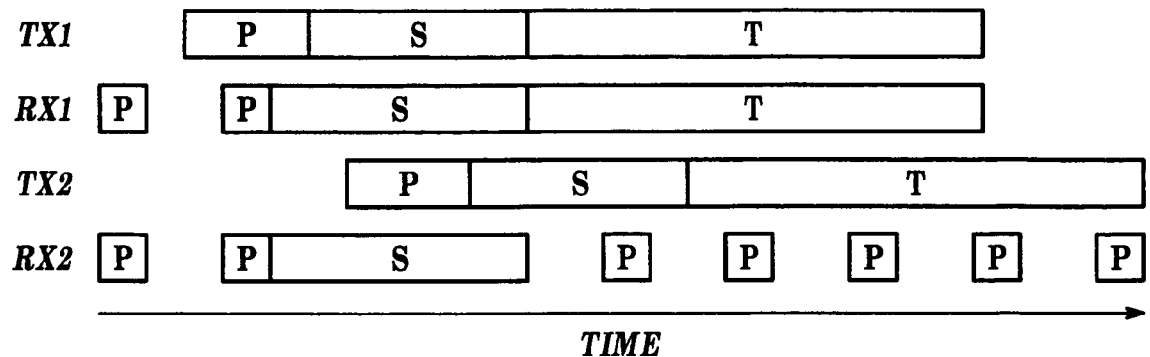
- *PRIOR ART* - FIG. 1
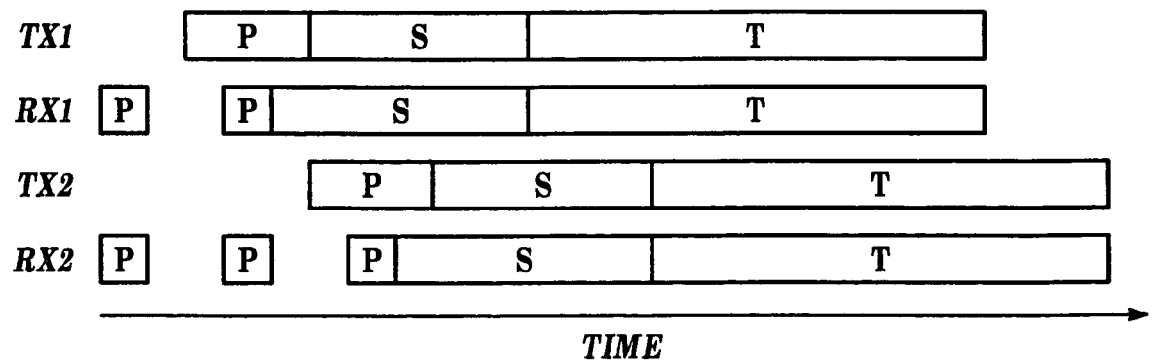
FIG. 2

METHOD AND SYSTEM OF REDUCING COLLISIONS IN AN ASYNCHRONOUS COMMUNICATION SYSTEM

CROSS-REFERENCE TO RELATED APPLICATIONS

Not applicable

FIELD OF THE INVENTION

This invention relates in general to asynchronous communication systems, and more specifically to a method and system for using a preamble to reduce collisions.

BACKGROUND OF THE INVENTION

In radio communication systems it is normally necessary for a receiver to determine whether a transmitter is trying to initiate a communication. In such systems where the transmitter is normally active or systems where the air interface includes scheduling information, this issue is readily resolved. However in systems using an asynchronous protocol for communications, determining whether a communication is desired in an efficient manner is still a significant problem. This problem is further exacerbated where the particular frequency for the communications is unknown and by frequency mismatches between the transmitter and receiver, particularly for battery life sensitive applications. The power consumed in monitoring for an asynchronous communication from another device to determine whether an attempt to communicate has occurred may significantly reduce the battery life and thus available service time of the mobile unit.

An asynchronous, dispatch, voice communication system can identify when communications are desired given frequency offsets between communications devices. For example, such asynchronous system can use a preamble signal as a mechanism by which an originating device may "wake up" a target device from a stand-by mode. Transmitting a predetermined waveform to initiate communication between asynchronous devices is known in the art. Such a system operates well from the standpoint of a single user. Unfortunately, such an asynchronous system is not as efficient from a system perspective when multiple users share the same channel. More specifically, if an air interface specifies only one known preamble waveform, then any transmission on a given channel will wake up all receivers from stand-by mode that are within range and monitoring that channel. All of these receivers will then complete the synchronization process with the originating device, processing information related to the call type, target address or ID, etc., to determine if the transmission is intended for them. Using one known preamble disrupts all of these receivers from stand-by mode even though the transmission may not have been intended for them. Such needless disruption of unintended receivers creates a situation where even intended receivers may actually miss transmissions.

SUMMARY OF THE INVENTION

In a first embodiment in accordance with the present invention, a method of reducing collisions in an asynchronous communication system can include the steps of generating a set of known preamble waveforms and transmitting at least one distinguishable preamble waveform among the set of known preamble waveforms based on an association with a call type and a receiver identifier. Note that at least one preamble waveform is distinguishable from a remaining set of preamble waveforms among the set of known preamble waveforms. The step of generating can include the step of forming a set of known, periodic, preamble waveforms using continuous-phase frequency-shift keying, modulated such that the signals toggle between two frequencies. The preamble waveforms can be made distinguishable from one another either dynamically or apriori by altering at least one among a frequency spacing, a duty cycle with which the frequencies are toggled, and a code size. The method can further include the step in a receiver of calculating a correlation between a received signal and an undistorted version of a transmitted preamble waveform, for every known preamble waveform within the set. The method can further include the step of rejecting the received signal if a ratio of an undesired-to-desired correlation exceeds a predetermined threshold, for any one of a set of undesired preambles. In this regard, a desired preamble can be based on a call type and on a receiver identifier associated with the call type. The method can further include the step at a receiver of computing a measure of envelope variation for a received envelope and the step of rejecting the received signal if a normalized correlation metric with a desired preamble signal falls below a predetermined threshold while the received envelope is measured to be fairly constant having minor or no envelope variation. Note, the envelope variation can be measured as a normalized variance or by computing the number of received envelope-squared samples which fall within a region, where the region is formed as a function of an average power of the received samples.

In a second embodiment of the present invention, a method of reducing collisions in an asynchronous communication system can include the steps of receiving at least one preamble waveform among a set of different preamble waveforms which toggle between two symbol frequencies, the different preamble waveforms being distinguishable by at least having one among a different symbol frequency spacing and a different symbol toggling duty cycle, and selecting to decode a preamble waveform among the set of different preamble waveforms based on at least one among the different symbol frequency spacing and the different symbol toggling duty cycle. The method can further include the step of basing a desired preamble waveform on a receiver's call types and identifiers associated with each of the receiver's call types that are available.

In a third embodiment of the present invention, a wireless transmitter arranged to transmit a preamble signal to wake up specified target receivers can include a signal generator for generating a set of known preamble waveforms including a distinguishable preamble waveform from a remaining set of preamble waveforms and a transmitter apparatus coupled and responsive to the signal generator to transmit at least one among the set of preamble waveforms that is distinguishable based on an association with a call type and a target identifier. The call types can be selected among a private call, a code call, and a group call for example and the transmitter apparatus can transmit at least one among the set of preamble waveforms on a plurality of predetermined carrier frequencies. The signal generator can form a set of known, periodic, preamble waveforms using continuous-phase frequency-shift keying, modulated such that the signals toggle between two frequencies. The signal generator can include a signal source that alters the at least one preamble waveform by altering at least one among a frequency spacing, a duty cycle with which the frequencies are toggled, and a code size. Note that the preamble waveforms can be made distinguishable either dynamically or apriori.

In a fourth embodiment, a wireless transmitter arranged to transmit a preamble signal to wake up specified target receivers can include a signal generator for generating a set of known preamble waveforms, a signal source that alters at least one of the preamble waveforms in the set of preamble waveforms to provide a distinguishable preamble waveform from a remaining set of preamble waveforms, and a transmitter apparatus coupled and responsive to the signal source to transmit at least one among the set of preamble waveforms made distinguishable based on an association with a call type and a target identifier.

In a fifth embodiment, a wireless receiver arranged to detect a preamble signal among a set of known preamble waveforms to exit a standby mode can include a receiver for scanning, asynchronously and sequentially during a wakeup time, a plurality of communication resources, a sampler, coupled to the receiver, for collecting a plurality of received sample sequences, one sample sequence collected at each of the plurality of communication resources, and a controller coupled to the receiver and sampler. The controller can be programmed to calculate, for each of the plurality of communication resources, a correlation between a received signal and an undistorted version of a transmitted preamble waveform, for every known preamble waveform within the set. The controller can be further programmed to reject the received signal if a ratio of the undesired-to-desired correlation exceeds a predetermined threshold, for any one of a set of undesired preambles. Note, a desired preamble signal is based on a call type and a receiver ID associated with the call type.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages of the present invention FIG. 1 is a timing diagram for receivers and transmitters in a communication system using a preamble, synchronization blocks and a traffic channel without having distinguishable preambles.

FIG. 2 is a timing diagram for receivers and transmitters in a communication system using distinguishable preambles in accordance with an embodiment of the present invention.

DETAILED DESCRIPTION OF THE DRAWINGS

Figure 3:
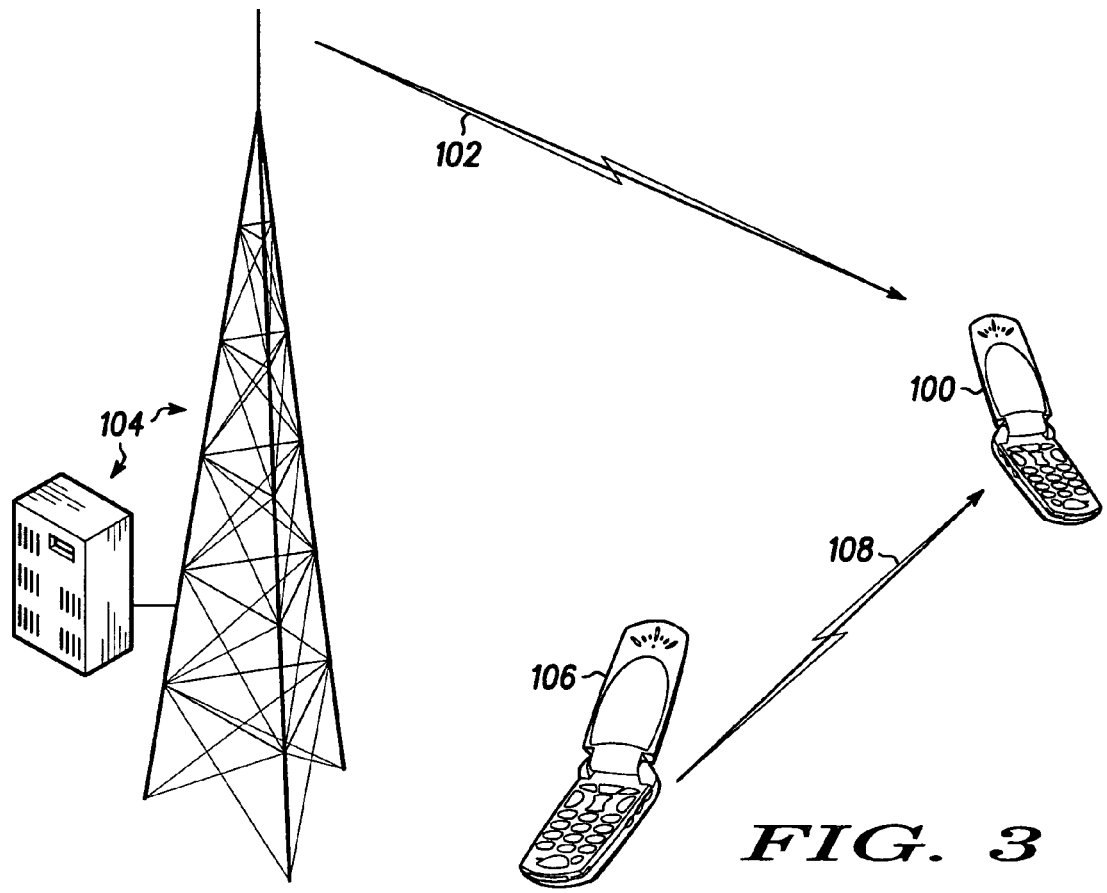
FIG. 3 depicts, in a simplified and representative view, the system elements of a wireless communications environment in accordance with an embodiment of the present invention.

Referring to FIG. 1, a timing diagram for receivers and transmitters in a communication system without having distinguishable preambles is shown where P represents the preamble channel, S represents the synchronization or call set-up channel, and T represents the traffic channel.

Assume that the transmitter Tx1 sends a transmission to receiver Rx1, and that transmitter Tx2 sends a transmission to Rx2. The receivers Rx1 and Rx2 periodically monitor the preamble channel in a stand-by mode, until Tx1 transmits the preamble waveform, before Tx2 transmits its preamble waveform. Both Rx1 and Rx2 go to the synchronization channel to get the call information, during which time, transmitter Tx2 sends its preamble. While Rx1 verifies that it is the target device, and proceeds to decode the traffic channel synchronously with Tx1, receiver Rx2 abandons the call, and reverts to monitoring the preamble channel. However, the overhead Rx2 expended in verifying it is not the target device has caused Rx2 to miss the preamble transmission from Tx2, and the call is missed.

Referring to FIG. 2, a scenario in accordance with an embodiment of the present invention rectifies the issues presented in FIG. 1. In FIG. 2, Rx2 ignores the preamble transmitted by Tx1, and "wakes up" only when the preamble is transmitted by Tx2. In this case, Rx2 is not disrupted from stand-by mode by Tx1, thus, enabling Rx2 to synchronize to and receive the call from Tx2.

In order to realize the improvement illustrated by FIG. 2, a set of preamble waveforms can be specified, where the transmitted preamble is chosen from this set, based on the address or ID of the target device. These waveforms should lend themselves to reliable frequency acquisition, in order to facilitate the synchronization process between devices. Additionally, the set of preamble waveforms from which to draw should exhibit low cross-correlation with one another, across time and frequency offset, so that a preamble detector may adequately discriminate between them.

Furthermore, the preamble detector should operate such that the false alarm rate, i.e., the probability that a receiver is woken up by the wrong preamble waveform, is small. Embodiments of the invention herein demonstrate a preamble waveform set offering excellent frequency acquisition and preamble detection algorithms which attain low false alarm probabilities between different preamble waveforms. Note that embodiments herein relate to asynchronous communication systems where units operate in "Talk-Around" mode (no fixed network equipment involved) or to multiple access systems employing frequency hopping, where the primary modulation choice is continuous-phase frequency shift keying (CPFSK). Of course, embodiments of the present invention are not limited thereto and other modulation schemes can be used within contemplation of the scope of the claims.

In the existing system described above, the preamble waveform is specified to be periodic over the time interval NT, where N is the preamble detector observation interval, in symbols, and T is the symbol duration. This preamble waveform is achieved by repeating a fundamental waveform $s_0(t)$, of duration NT, which has the property $S_0(0)=s_0(NT)$.

In one embodiment, a set of fundamental waveforms is proposed $$\{s_m(t): 0 \leq m \leq N_P-1\},$$

where $N_p$ is the number of preambles to draw from, and where each fundamental waveform satisfies the condition $$S_m(0) = s_m(NT)$$

for each $0 \leq m \leq N_p - 1$

As in the existing system, each preamble signal can be generated in the form of a CPFSK signal $$s_m(t) = exp[j\phi_m(t)].$$

At the end of symbol interval k, the modulated phase is given by $$\phi_m((k+1)T) = \pi h \sum_{i=0}^{k} u_{m,i},$$

where h is the modulation index, and $\{u_{m,k}: 0 \leq k \leq N-1\}$ is the length-N symbol sequence associated with preamble number m One way to satisfy the requirement for periodicity is if the symbol sequence satisfies $$\sum_{i=0}^{N-1} u_{m,i} = 0$$

for each $0 \leq m \leq N_p - 1$. The following set of 13 exemplary preamble symbol sequences, each of length N=8, satisfies this requirement:

|        | k = 0 | k = 1 | k = 2 | k = 3 | k = 4 | k = 5 | k = 6 | k = 7 |
|--------|-------|-------|-------|-------|-------|-------|-------|-------|
| m = 0  | +2.00 | +2.00 | +2.00 | +2.00 | −2.00 | −2.00 | −2.00 | −2.00 |
| m = 1  | +2.25 | +2.25 | +2.25 | +2.25 | −2.25 | −2.25 | −2.25 | −2.25 |
| m = 2  | +2.50 | +2.50 | +2.50 | +2.50 | −2.50 | −2.50 | −2.50 | −2.50 |
| m = 3  | +2.75 | +2.75 | +2.75 | +2.75 | −2.75 | −2.75 | −2.75 | −2.75 |
| m = 4  | +3.00 | +3.00 | +3.00 | +3.00 | −3.00 | −3.00 | −3.00 | −3.00 |
| m = 5  | +3.25 | +3.25 | +3.25 | +3.25 | −3.25 | −3.25 | −3.25 | −3.25 |
| m = 6  | +3.50 | +3.50 | +3.50 | +3.50 | −3.50 | −3.50 | −3.50 | −3.50 |
| m = 7  | +3.75 | +3.75 | +3.75 | +3.75 | −3.75 | −3.75 | −3.75 | −3.75 |
| m = 8  | +4.00 | +4.00 | +4.00 | +4.00 | −4.00 | −4.00 | −4.00 | −4.00 |
| m = 9  | +4.25 | +4.25 | +4.25 | +4.25 | −4.25 | −4.25 | −4.25 | −4.25 |
| m = 10 | +4.50 | +4.50 | +4.50 | +4.50 | −4.50 | −4.50 | −4.50 | −4.50 |
| m = 11 | +4.75 | +4.75 | +4.75 | +4.75 | −4.75 | −4.75 | −4.75 | −4.75 |
| m = 12 | +5.00 | +5.00 | +5.00 | +5.00 | −5.00 | −5.00 | −5.00 | −5.00 |

In this embodiment, the preambles can be assigned to transmissions as follows:
1. 8 preamble sequences can be designated for private calls. Let these 8 sequences be labeled as $\{P(i): 0 \leq i \leq 7\}$. The preamble number is then assigned as follows, for private calls:

Preamble number=P(ID mod 8),
where ID is the private ID or address of the target.
2. 4 preamble sequences can be designated for code calls. Let these 4 sequences be labeled as $\{C(i): 0 \leq i \leq 3\}$. The preamble number is then assigned as follows, for code calls:

Preamble number=C(ID mod 4),
where ID is the code ID of the target.
3. 1 preamble sequence can be designated for group calls.
Note that it is more likely that two code users will share the same preamble number than two private users, since only 4 preambles are designated for code calls, while 8 are designated for private calls. If a target can accept private, code, and group calls, then it can look for multiple preamble waveforms when scanning the preamble channel in stand-by mode. Only one preamble can be designated for group calls, since, in this embodiment, a user can belong to an unlimited number of groups.

Note that each preamble waveform toggles between two frequencies over the course of the fundamental waveform, i.e., we have a set of two-tone preambles. For the modulation index h=1, these sequences lend themselves to particularly accurate frequency offset estimation, as opposed to the existing non-binary BCH codes, which are not nearly as good for offset estimation. In addition, the maximum normalized cross-correlation, over time and frequency offset, is 0.4 for adjacent preamble numbers, and 0.25 for non-adjacent preamble numbers. The low cross-correlations are achieved by assigning different symbol frequency spacings to the different preamble waveforms. It should be appreciated that the maximum cross-correlation can be reduced from 0.4 to 0.25 by omitting the odd preamble numbers in this list. By doing this, however, we would reduce the number of preambles available, and, therefore, increase the likelihood that two different users would be assigned the same preamble number. If we tried to add more preambles by increasing the symbol values beyond +/−5.00, we could potentially go outside the designated channel bandwidth, which causes problems with adjacent channel interference, as well as receiver filter attenuation of the desired signal.

The designer has the discretion to choose different code sizes, frequency spacings, duty cycles, etc., based on the need. Fundamentally, a set of waveforms is chosen that toggle between two symbol frequencies, and where the different preamble waveforms are distinguished by different symbol frequency spacings, and different symbol toggling duty cycles, if preferred.

Referring to FIG. 3, a simplified and representative view of various system elements of a wireless communications environment will be discussed and described. A wireless communication device 100 is able to receive a signal 102 from a fixed transmitter 104 as well as a signal 108 from another wireless communication device. The frequency of the received signal 102, 108 is directly related to or determined by the frequency of a signal provided by a signal source to the transmitters of the wireless communications devices 104, 106. This frequency will likely be different from the frequency of a corresponding signal source in the receiver of the wireless communication device 100. The difference between these two frequencies translated to the nominal channel frequency or the frequency that the signal on the channel is supposed to be at is called or referred to as the frequency mismatch between the transmitter and receiver. This frequency mismatch in part or in combination with other non-ideal characteristics in the wireless communication device can result in missed communications attempts. For example, this frequency mismatch for carriers in the 900 MHz range can be as much as 9 KHz if both signal sources have a 5 part per million tolerance and this is typical for the wireless communication devices 100, 106. This large frequency offset particularly arises when the wireless communications devices 100, 106 are engaged in talk around or direct communications as suggested by the signal 108. The large frequency offset encountered in direct communications scenarios is further exacerbated since these communications are ordinarily entirely asynchronous. In asynchronous communications the receiver has no indication when the transmitter will attempt a communication. Another issue with asynchronous communication is that clock synchronization is not routinely available and the wireless communication device 100 must use a methodology to overcome any timing offsets between the respective clocks. The infrequent and unpredictable nature of direct communication makes it impractical to use synchronous communication methods, mainly due to the power drain on portable unit batteries to maintain frequency and timing synchronization. In an asynchronous environment, the burden of identifying a valid signal and correcting for frequency and timing mismatches falls on the receiver. The concern for battery life requires that special consideration is paid to minimize the length of time a wireless receiver must be active when detecting an asynchronous communication as well as minimizing the processing steps required to analyze an incoming signal for a message identifier that indicates an asynchronous communication attempt has been made.

Mitigation of frequency offset, timing offset and power-efficient message identifier detection are achieved when the wireless communication device and its component wireless receiver are arranged to operate as described below. The wireless communication device 100 can be a typical cellular telephone or handset such as those available from manufacturers, such as Motorola. One such handset, commonly referred to as the model i95, can advantageously utilize the principles and concepts when enhanced as described in the following disclosure. The essential elements of the transmitter of FIG. 4 can be used in both fixed transmitters 104 and portable wireless communication devices 106. The transmitter 200 is common to communications infrastructure systems similar to Integrated Digital Enhanced Network equipment available from Motorola and utilized in networks operated by service providers, such as Nextel Communications. Alternatively, the transmitter 200 is included in a second portable wireless handset, wherein both handsets are configured to communicate directly with one another in a direct communication mode as noted above.

Figure 4:
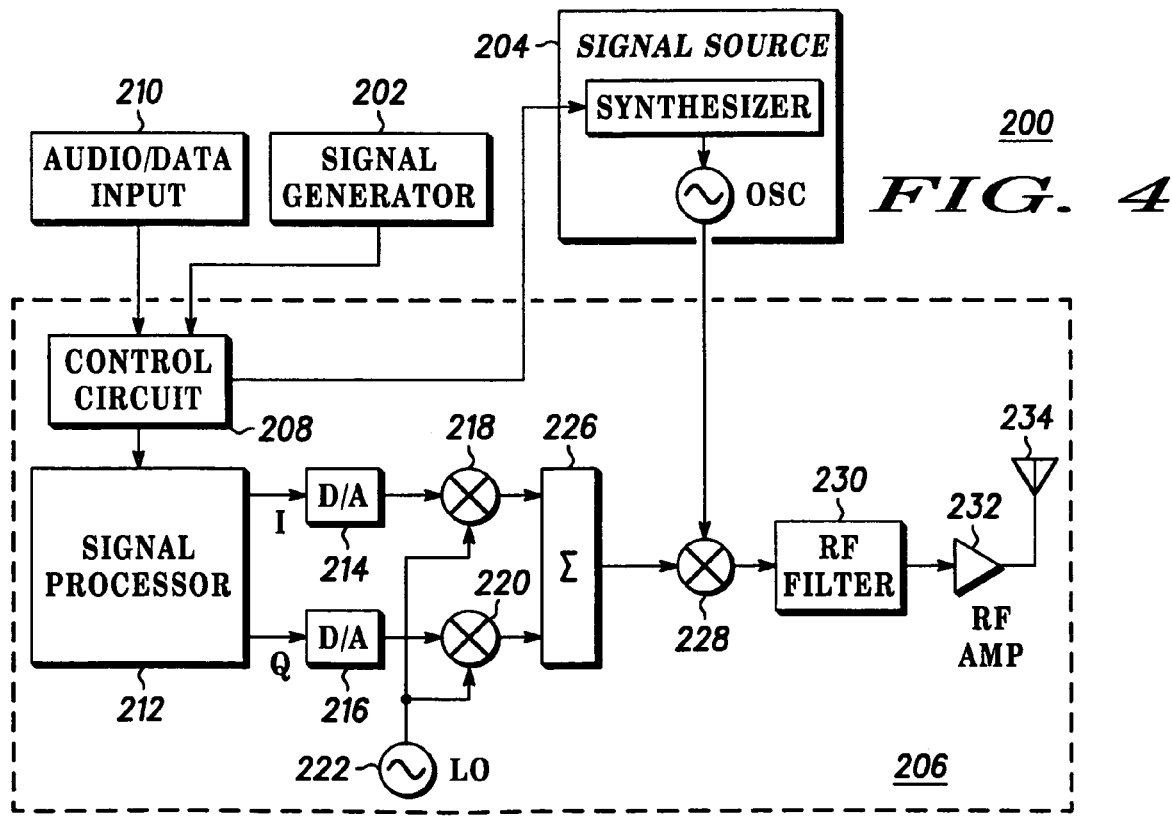
FIG. 4 depicts, in an exemplary form, a block diagram of a transmitter arranged to transmit a preamble signal in accordance with an embodiment of the present invention.

Referring to FIG. 4, an exemplary block diagram of a transmitter 200 arranged to transmit a preamble signal is discussed and described. The transmitter 200 comprises a signal generator 202, a signal source 204, a transmitter circuit 206, a control circuit 208, and an audio/data input 210 inter coupled as depicted. The transmitter circuit 206 includes a control circuit 208 that is coupled to and is capable of selecting whether audio/data from the audio/data input 210 or a preamble or preamble signal or message identifier generated by the signal generator 202 will be coupled to and transmitted or broadcast by the transmitter 200. The block diagram is depicted in this fashion for clarity. In alternative embodiments the functions of certain entities, such as the signal generator 202, control circuit 208 and a portion of the audio/data input may be included along with others in a signal processor 212. The control circuit 208 is coupled to and controls the signal source 204 to set the carrier frequency of the transmitter 200. The signal processor 212 outputs I and Q digital signal pairs to drive the digital to analog (D/A) converters 214, 216. The analog outputs of the D/A converters 214, 216 are combined in the mixers 218, 220 with an injection signal from a local oscillator 222. The local oscillator is coupled directly to a mixer 218 and through a phase shifter 224 that shifts the phase of the injection signal by $\pi/2$ radians to a mixer 220. The outputs of the mixers 218, 220 are added in a summing circuit 226 and the combined output is mixed onto or up converted to a radio frequency signal with a carrier frequency that is established by the signal source 204. An RF filter 230 limits the sidebands and a final amplifier 232 increases the power of the modulated carrier for broadcast from an antenna 234.

The components in the transmitter 200 and operation thereof are well known and available, with the exception of the signal generator. The signal source 204 may be a fractional-N synthesizer. The mixers 218, 220, 228, filter 230, amplifier 232, digital to analog converters, 214, 216, phase shifter 224 and summing circuit 226 are all commercially available and known in the art. The signal processor 212 is or may include a digital signal processor. Such a device, in an exemplary design may be one of several devices from manufacturers such as Motorola, Inc. The control circuit 208 and signal generator may be a standalone circuit, such as a commercially available field programmable gate array or, as mentioned above, may be included in the signal processor 212 and implemented in or facilitated by a software program. The signal generator 202, can be implemented in hardware using, for example, a field programmable gate array coupled to a system level clock (not shown) to provide the preamble signal according to the details provided herein. Alternatively the preamble can be provided at least in part by the signal processor.

In operation, the transmitter 200 is arranged to transmit a preamble signal to wake up target receiver(s) where the transmitter 200 comprises the signal generator 202 for creating the preamble signal. The preamble signal comprises a data sequence that is periodic over a preamble period and repeated during a plurality of time periods or time slots. The transmitter 200 also comprises the signal source 204 that provides a signal that establishes the transmitter operating frequency as a unique and predetermined frequency during each of the plurality of time slots or periods. The transmitter further includes the transmitter circuit or apparatus 206 that is coupled and responsive to the signal source 204 to transmit the signal modulated by the preamble signal during the plurality of time periods. The transmitter 200 is an element of a two-way radio system. In one embodiment it may be a part of a standalone, fixed base unit 104. In another embodiment the transmitter 200 can be part of a portable transceiver 106 arranged for direct portable-to-portable communications.

Figure 5:
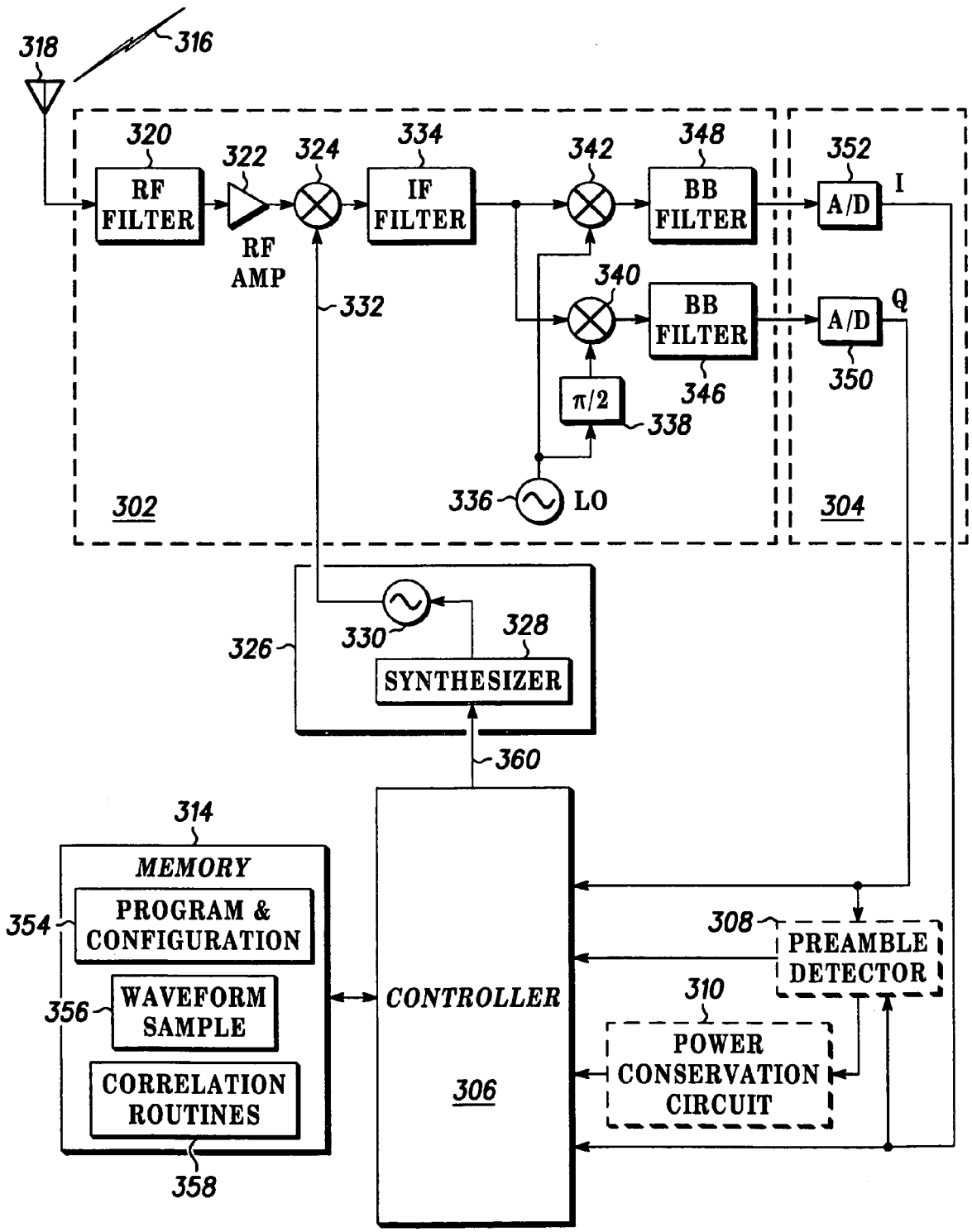
FIG. 5 depicts, in an exemplary form, a block diagram of a wireless receiver arranged to detect a preamble signal in accordance with an embodiment of the present invention.

The transmitter 200 and the herein described preamble signal can be particularly applicable to systems using continuous-phase frequency shift key (CPFSK) modulation of a carrier signal. Furthermore this type of carrier can be used in frequency hopped systems where the frequency of the transmission or frequency of the carrier is changed to a different frequency in a succession of time slots, for example 64 time slots of 90 milliseconds each. Each time slot is used to transmit a coded signal. In an exemplary embodiment, the first three slots are used to transmit the preamble signal with predetermined characteristics for use by a receiver 300 (as shown in FIG. 5) in detecting the presence of the transmission. In a further exemplary embodiment, the first three slots for transmitting the preamble signal are always on the same three predefined frequencies.

Now that the communication system, the transmitter, and the method for transmitting among a set of preamble waveforms has been discussed, a receiver and techniques for detecting and receiving one or more preambles drawn from the same set should be illustrated. First, with reference to FIG. 5, an exemplary block diagram of a wireless receiver 300 arranged to detect a preamble signal will be discussed and described. The wireless receiver 300 is a component of the wireless communication devices 100, 106 and is comprised of one or more components or elements that in practice can exhibit non-ideal characteristics such as frequency instability. These non-ideal characteristics arise from the statistical nature and variation of the components used in the construction of the wireless receiver 300, environmental factors such as battery voltage level and temperature, and other unplanned interactions among elements of a real receiver.

There are several impacts of variability on the wireless receiver. Among them may be frequency variation. Frequency variation is often the result of the inherent variations of the components comprising and surrounding a signal source and other factors such as temperature and component changes with age. Frequency variation will cause a received signal to be shifted above or below an intended frequency. It is then necessary to mitigate the effects of the frequency variation when processing a received signal. Another impact of the wireless receiver 300 that must be overcome, particularly in the asynchronous environment is clock timing synchronization.

The wireless receiver 300 is arranged for using or detecting the preamble signal as discussed above or a similar specialized preamble message and comprises a receiver 302 coupled to a sampler 304 for providing a plurality of received sample sequences to a controller 306, normally including a digital signal processor (DSP). A preamble detector circuit 308 and power conservation circuit 310 may be standalone circuits or implemented as functions of the controller 306. The preamble detector 308 operates as described below. The power conservation circuit 310 operates to reduce the power consumption of the wireless communication device 100 by removing or reducing the power to non-essential circuits or reducing their clock rate to correspondingly reduce their power consumption during periods of inactivity or reduced activity. The power conservation circuit 310 operates to reduce power usage when the wireless receiver 300 is only monitoring for a preamble signal or the wireless communication device 100 is in another low power mode. The controller 306 is coupled to a memory 314 comprising volatile and non-volatile memory.

The receiver 302 receives a signal 316 comprising a preamble signal at antenna 318. The received signal is shaped by a radio frequency filter 320 that operates to reject out of band energy of the received signal and this signal is then amplified by an RF amplifier 322. The signal is further processed at a mixer 324. A signal source 326 comprises a synthesizer 328 and voltage controller oscillator 330. The synthesizer 328 can be referenced to an oscillator (not shown) that is typically specified to be stable within 5 ppm (parts per million). The synthesizer 328 controls the frequency of the voltage controller oscillator 330 to produce an injection signal 332 for combining with and down converting the received signal at the mixer 324. The resulting intermediate frequency signal is shaped by an IF filter 334. In an exemplary digital receiver, the signal is split and mixed to two base band signals.

The frequency of the injection signal 332 may match or nearly match the received signal in the case of a zero intermediate frequency receiver or be deliberately offset an amount equal to an intermediate frequency, such as 13.7 megahertz. It is understood in the discussions below where the signal source is adjusted to allow the injection frequency to correct for a frequency mismatch with the received signal that it is in this context.

More specifically a second oscillator 336 produces a second injection frequency which is provided in a 90 degree shifted version for mixing with the intermediate frequency signal at mixer 340 and an unshifted version for mixing with the intermediate frequency signal at mixer 342. The resulting base band signals, normally referred to as I and Q signals are filtered by base band filters 346 and 348 respectively. These outputs of the receiver 302, specifically the output signals from the base band filters are provided to the sampler 304 as depicted. The sampler comprises analog-to-digital converters 350 and 352.

The analog-to-digital converters produce I and Q outputs that are digital signals and that are coupled or sent to the preamble detector 308 and the controller 306 or just the controller 306 depending on the implementation configuration.

The controller 306 is also coupled to or includes the memory 314 that is used for storing program instructions and configuration data 354, algorithms, such as correlation routines 358, as well as waveform samples 356 or information corresponding thereto that is used in the further processing of the received signal as well as a plurality of other routines that will be obvious to one of ordinary skill but that are not relevant for our purposes. The controller 306 is coupled to the signal source 326 and is operable to adjust the frequency of the signal source 326 by a control signal 360.

The structural elements of the wireless receiver 300 are generally known and available and may be modified to operate and function in accordance with the inventive principles and concepts disclosed herein. The signal source 326 may be, for example, a fractional-N synthesizer. The mixers 324, 340, 342, filters 320, 334, 346, 348, amplifier 322, oscillators 330, 336, phase shifter 338, and analog-to-digital converters 350, 352 are all commercially available and known in the art. In the exemplary case where the controller 306 is or includes a DSP, various devices are known and available from manufacturers such as Motorola, Inc. The memory 314, comprising volatile and non-volatile memory is also commercially available and known and may be included in total or part with the processor. The preamble detector 308, if implemented in software, will be implemented in or facilitated by the DSP or processor. When the preamble detector 308 is implemented in hardware a number of commercially available field programmable gate arrays or the like are suitable for performing the tasks, given the principles and concepts disclosed herein. Implementing a DSP task in logic hardware is known in the art and can be accomplished by one of ordinary skill in the art without undue experimentation given the discussion and explanations herein. The power conservation circuit 310 may be implemented by a commercially available field programmable gate array or in the DSP depending on the number of available controllable outputs on the DSP and the power reduction requirements of the circuitry under control.

In operation, the wireless receiver 300 is arranged to detect a preamble signal, such as the preamble described above and to exit a standby low power mode or the like when the preamble is detected. The wireless receiver 300 comprises a receiver 302 for scanning, asynchronously and sequentially during a wakeup time, a plurality of predetermined frequencies for the preamble signal.

Returning to FIG. 5, the wireless receiver 300 also comprises the sampler 304, coupled to the receiver 302, for collecting a plurality of received sample sequences, with one received sample sequence collected at each of the plurality of predetermined frequencies.

The wireless receiver 300 also comprises the controller 306 coupled to the receiver 302 and sampler 304 for performing a correlation based on stored routines 358 between data corresponding to the preamble signal stored in memory 356 and data corresponding to a received sample sequence to provide a correlation result and for comparing the correlation result to a threshold value, also stored in memory 314 to determine when the preamble signal has been detected. The power conservation circuit 310 coupled to the controller 306 operates to reduce the power consumption of the wireless receiver 300 until notified by the controller, specifically preamble detector, that the preamble signal has been detected.

Employing an optimum detection methodology requires that the preamble signal be synchronized in both time and frequency with the wireless receiver 300. The controller 306 is operable to estimate a frequency offset between one of the received sample sequences and a nominal frequency of the signal source 326 by locating a peak of a correlation of a magnitude squared value of a Fast Fourier Transform of the received sample sequence and a magnitude squared value of a Fast Fourier Transform of an expected preamble signal where the expected preamble is stored in the memory 356. This peak in the correlation results in or provides a frequency offset or estimate that can be used to adjust the received sample sequence according to the frequency offset to create an adjusted received sample. Then a circular time-domain correlation between data corresponding to the preamble signal and the adjusted received sample sequence can be calculated to provide the correlation result.

Further details of techniques for detecting or receiving one or more preambles drawn from the same set in accordance with embodiments of the present invention shall be described. In existing systems, methods are claimed for taking a discrete-time, received preamble sequence $$\{r(n): 0 \leq n < NN_s\},$$

where $N_s$ is the number of received samples per symbol, and producing the following quantities:

$C_1$: wideband correlation metric
$P_n$: Rx power (normalization factor)
$C_2$: narrowband correlation metric Threshold tests are performed using these quantities, to determine if the preamble signal has been received.

For the multiple preamble arrangement disclosed herein, a problem arises when a preamble is received, which is different from the desired preamble. The simple threshold test, comparing the normalized wideband correlation metric $C_1/P_n$ to a fixed threshold, will result in many false detections on an undesired preamble. The reason for this is that the cross-correlations, among the preamble set, are large enough so that an undesired preamble will trip the wideband threshold test. The table below shows the static sensitivity against a desired preamble, along with the false alarm rate against an undesired preamble, for a normalized wideband correlation threshold of $\eta_1=0.235$. Note that the false alarm rates are pretty high, especially at high values of $E_s/N_0$.

| Es/No (dB) | Detection rate | False alarm rate |
|---|---|---|
| 2.5 | 0.033 | 0 |
| 4.5 | 0.208 | 0.014 |
| 6.5 | 0.636 | 0.085 |
| 8.5 | 0.928 | 0.137 |
| 10.5 | 0.989 | 0.122 |
| 12.5 | 0.998 | 0.143 |

We propose an algorithm, based on optimum detection principles, which performs likelihood ratio tests against all undesired preambles. When detecting a desired preamble number $m_0$, compute the following quantities in the preamble detector:

$C_1(m)$: wideband correlation metric for each preamble $0 \leq m \leq N_p-1$ $P_n$: Rx power (normalization factor)

The computation of these quantities is done as prescribed in the prior art, based on the signal templates for each of the known preamble waveforms. The desired preamble is said to be detected if all of the following conditions are met:

1. $C_1(m_0) \geq \eta_1 P_n$
2. $C_1(m_0) \geq \eta_2 C_2$
3. $C_1(m_0) \geq \eta_3 C_1(m)$ for all $m \neq m_0$ Using the new threshold value $\eta_3=0.875$ for rejecting "other preambles", we get the results below:

| Es/No (dB) | Detection rate | False alarm rate |
|---|---|---|
| 2.5 | 0.028 | 0 |
| 4.5 | 0.215 | 0.005 |
| 6.5 | 0.673 | 0.008 |
| 8.5 | 0.919 | 0.001 |
| 10.5 | 0.978 | 0 |
| 12.5 | 0.995 | 0 |

Note that the sensitivity has been preserved, while the falsing rates have been reduced dramatically. A drawback of this algorithm is that it must compute the wideband correlation metric for each of the $N_p$ preambles specified in the air interface. This may be prohibitive in receivers with limited computational resources. The following "anti-falsing" algorithm may be performed in conjunction with, or in place of, the algorithm described heretofore. Compute the following quantities in the receiver:

$$\mu_{rr} = \frac{1}{NN_s} \sum_{n=0}^{NN_s-1} |r(n)|^2$$

$$\text{flag\_in}(n) = \begin{cases} 0 & \text{if } |r(n)|^2 > 1.5\mu_{rr} \\ 0 & \text{if } |r(n)|^2 < 0.5\mu_{rr} \\ 1 & \text{else} \end{cases}$$

$$\text{num\_in} = \sum_{n=0}^{NN_s-1} \text{flag\_in}(n).$$

The quantity "num_in" will be large, i.e., approaching $NN_s$, whenever a fairly strong FSK signal is received, since most of the received samples will have a magnitude-squared close to the average received power of the samples. A signal is automatically rejected if the following conditions are met:

1. $C_1(m_0) < 0.5 P_n$

AND 2. num_in > num_in_thresh

This additional test helps reduce the occurrence of false detections, because, when the normalized wideband correlation with the desired preamble is marginal, we should have a pretty noisy signal. However, if we also have a fairly constant received envelope, that means the signal is strong. So, if condition 1 is met, i.e., a marginal correlation with the desired preamble is observed, and if condition 2 is met, i.e., the envelope is fairly constant, meaning the signal-to-noise ratio is fairly high, then we reject the signal, because it is likely that we are correlating with the wrong signal. The results below summarize the performance using this algorithm in place of the previous likelihood ratio tests, with num_in_thresh=60, and $NN_s=128$.

| Es/No (dB) | Detection rate | False alarm rate |
| --- | --- | --- |
| 2.5 | 0.029 | 0 |
| 4.5 | 0.217 | 0.01 |
| 6.5 | 0.647 | 0.079 |
| 8.5 | 0.892 | 0.017 |
| 10.5 | 0.924 | 0.003 |
| 12.5 | 0.980 | 0.008 |

The results below summarize the performance using this algorithm in conjunction with the previous likelihood ratio tests, with num_in_thresh=64.

| Es/No (dB) | Detection rate | False alarm rate |
| --- | --- | --- |
| 2.5 | 0.023 | 0 |
| 4.5 | 0.206 | 0.003 |
| 6.5 | 0.643 | 0.004 |
| 8.5 | 0.908 | 0 |
| 10.5 | 0.964 | 0 |
| 12.5 | 0.991 | 0 |

Note that, in addition to reducing the false detection rate with other undesired preambles, this algorithm helps reduce false detection rates against any undesired FSK signal.

Figure 6:
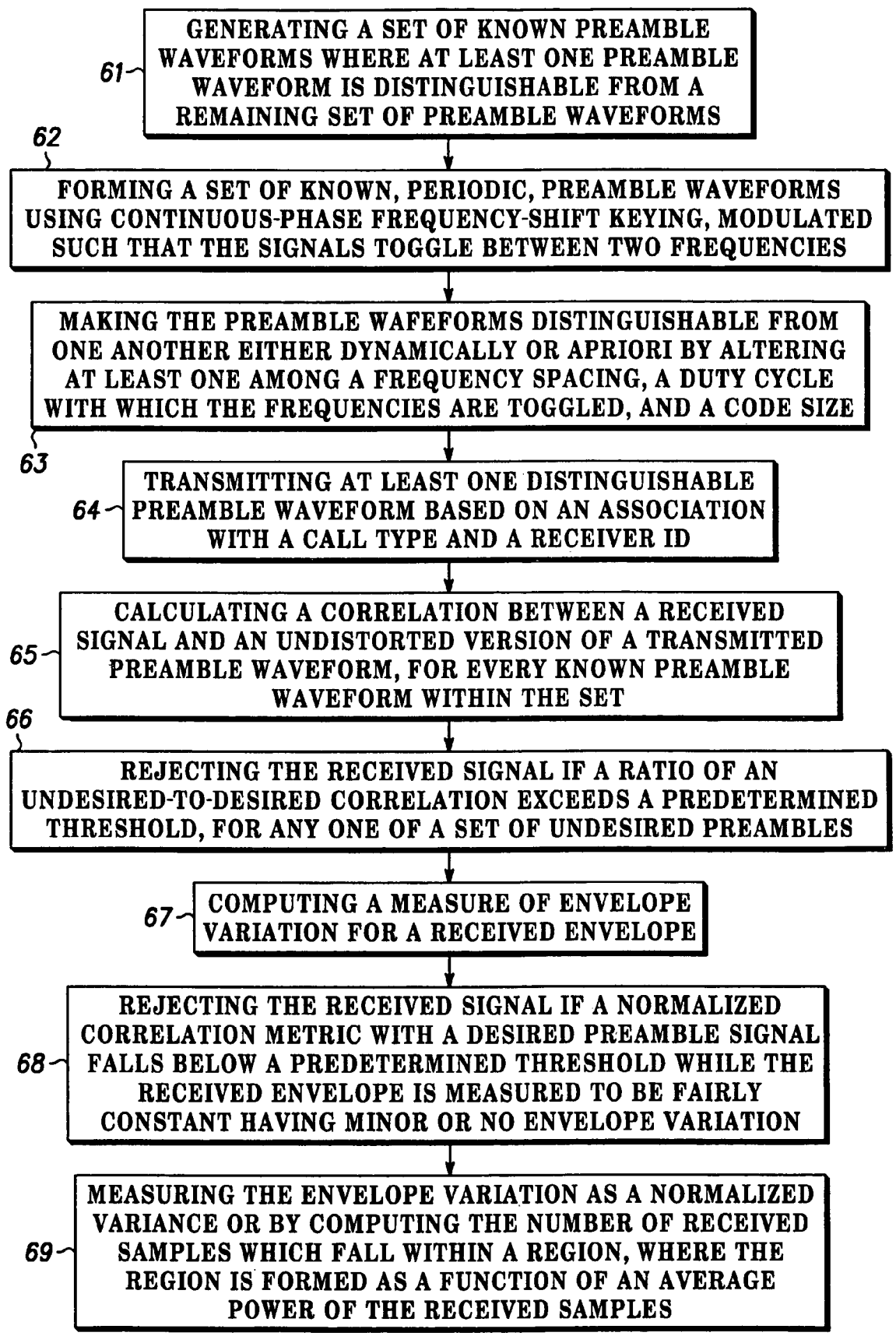
FIG. 6 is a flow chart illustrating a method of reducing collisions in an asynchronous communication system in accordance with an embodiment of the present invention.

Referring to FIG. 6, a flow chart illustrating a method 60 in accordance with the present invention of reducing collisions in an asynchronous communication system is shown. The method 60 can include the steps of generating a set of known preamble waveforms at step 61 and transmitting at step 64 at least one distinguishable preamble waveform among the set of known preamble waveforms based on an association with a call type and a receiver identifier. Note that at least one preamble waveform is distinguishable from a remaining set of preamble waveforms among the set of known preamble waveforms. The step of generating can include the optional step 62 of forming a set of known, periodic, preamble waveforms using continuous-phase frequency-shift keying, modulated such that the signals toggle between two frequencies. The preamble waveforms can be made distinguishable from one another either dynamically or apriori by altering at least one among a frequency spacing, a duty cycle with which the frequencies are toggled, and a code size at step 63. The method 60 can further include a step 65 in a receiver of calculating a correlation between a received signal and an undistorted version of a transmitted preamble waveform, for every known preamble waveform within the set. The method can further include a step 66 of rejecting the received signal if a ratio of an undesired-to-desired correlation exceeds a predetermined threshold, for any one of a set of undesired preambles. In this regard, a desired preamble can be based on a call type and on a receiver identifier associated with the call type. The method 60 can further include a step 67 at a receiver of computing a measure of envelope variation for a received envelope and a step 68 of rejecting the received signal if a normalized correlation metric with a desired preamble signal falls below a predetermined threshold while the received envelope is measured to be fairly constant having minor or no envelope variation. Note, the envelope variation at step 69 can optionally be measured as a normalized variance or by computing the number of received envelope-squared samples which fall within a region, where the region is formed as a function of an average power of the received samples.

Figure 7:
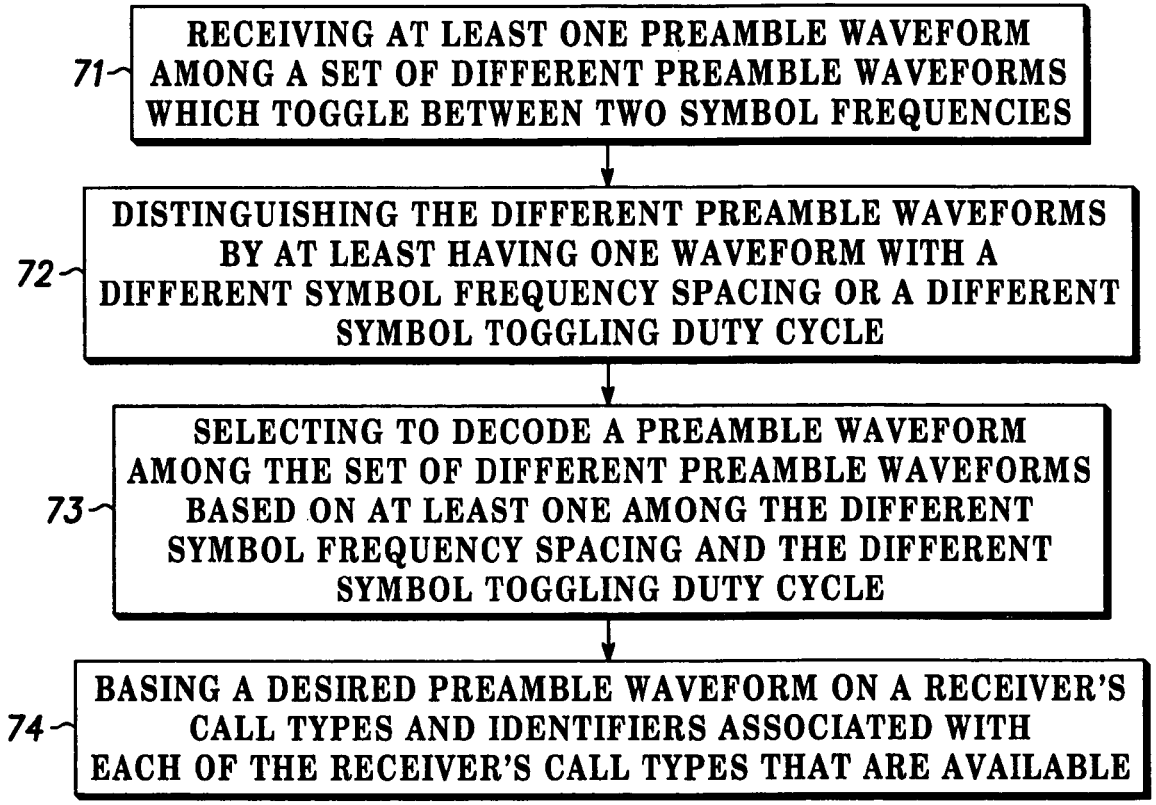
FIG. 7 is a flow chart illustrating a method of reducing collisions in an asynchronous communication system at a receiver in accordance with another embodiment of the present invention.

Referring to FIG. 7, a flow chart illustrating another method 70 of reducing collisions in an asynchronous communication system is shown. The method 70 can include the steps of receiving at least one preamble waveform among a set of different preamble waveforms which toggle between two symbol frequencies at step 71, the different preamble waveforms being distinguishable at step 72 by at least having one among a different symbol frequency spacing and a different symbol toggling duty cycle, and selectirig at step 73 to decode a preamble waveform among the set of different preamble waveforms based on at least one among the different symbol frequency spacing and the different symbol toggling duty cycle. The method 70 can further include a step 74 of basing a desired preamble waveform on a receiver's call types and identifiers associated with each of the receiver's call types that are available.

Much of the inventive functionality and many of the inventive principles are best implemented with or in software programs or instructions and integrated circuits (ICs) such as application specific ICs. It is expected that one of ordinary skill, notwithstanding many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, any discussion of such software and ICs, if any, was to be limited to the essentials with respect to the principles and concepts of the preferred embodiments.

In light of the foregoing description, it should be recognized that embodiments in accordance with the present invention can be realized in hardware, software, or a combination of hardware and software. A communications system or device according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

Additionally, the description above is intended by way of example only and is not intended to limit the present invention in any way, except as set forth in the following claims.

What is claimed is:

1. A method of reducing collisions in an asynchronous communication system, comprising the steps of:
   in the asynchronous communication system, generating a set of known preamble waveforms, wherein at least one preamble waveform is distinguishable from a remaining set of preamble waveforms among the set of known preamble waveforms; and transmitting at least one distinguishable preamble waveform among the set of known preamble waveforms based on an association with a call type and a receiver identifier.

2. The method of claim 1, wherein the step of generating comprises the step of forming a set of known, periodic, preamble waveforms using continuous-phase frequency-shift keying, modulated such that the signals toggle between two frequencies.

3. The method of claim 2, wherein the step of generating comprises the step of altering at least one among a frequency spacing, a duty cycle with which the frequencies are toggled, and a code size either dynamically or apriori.

4. The method of claim 1, wherein the method further comprises the step in a receiver of calculating a correlation between a received signal and an undistorted version of a transmitted preamble waveform, for every known preamble waveform within the set.

5. The method of claim 4, wherein the method further comprises the step of rejecting the received signal if a ratio of an undesired-to-desired correlation exceeds a predetermined threshold, for any one of a set of undesired preambles.

6. The method of claim 5, wherein a desired preamble is based on a call type and a receiver identifier associated with the call type.

7. The method of claim 4, wherein the method further comprises the step of computing a measure of envelope variation for a received envelope.

8. The method of claim 7, wherein the method further comprises the step of rejecting the received signal if a normalized correlation metric with a desired preamble signal falls below a predetermined threshold while the received envelope is measured to be substantially constant having minor or no envelope variation.

9. The method of claim 8, wherein the envelope variation is measured as a normalized variance.

10. The method of claim 8, wherein the envelope variation is measured by computing the number of received envelope-squared samples which fall within a region, and wherein the region is formed as a function of an average power of the received samples.

11. A method of reducing collisions in an asynchronous communication system, comprising the steps of:
receiving at least one preamble waveform among a set of different preamble waveforms which toggle between two symbol frequencies, the different preamble waveforms being distinguishable by at least having one among a different symbol frequency spacing and a different symbol toggling duty cycle;
selecting to decode a preamble waveform among the set of different preamble waveforms based on at least one among the different symbol frequency spacing and the different symbol toggling duty cycle; and
basing a desired preamble waveform on a receiver's call types and identifiers associated with each of the receiver's call types that are available.

12. A mobile device having a wireless transmitter arranged to transmit a preamble signal to wake up specified target receivers, the wireless transmitters comprising:
a signal generator for generating a set of known preamble waveforms including a distinguishable preamble waveform from a remaining set among the set of known preamble waveforms; and
a transmitter apparatus coupled and responsive to the signal generator to transmit to another mobile unit in an asynchronous communication system at least one among the set of preamble waveforms that is distinguishable based on an association with a call type and a target identifier.

13. The wireless transmitter of claim 12, wherein the signal generator forms a set of known, periodic, preamble waveforms using continuous-phase frequency-shift keying, modulated such that the signals toggle between two frequencies.

14. The wireless transmitter of claim 13, wherein the signal generator can include a signal source that alters the at least one preamble waveform by altering at least one among a frequency spacing, a duty cycle with which the frequencies are toggled, and a code size.

15. The wireless transmitter of claim 12, wherein the call types are selected among a private call, a code call, and a group call.

16. The wireless transmitter of claim 12, wherein the transmitter apparatus transmits at least one among the set of preamble waveforms on a plurality of predetermined carrier frequencies.

17. A mobile device having a wireless transmitter arranged to transmit a preamble signal to wake up specified target receivers, the wireless transmitters comprising:
a signal generator for generating a set of known preamble waveforms;
a signal source that alters at least one of the preamble waveforms in the set of preamble waveforms to provide a distinguishable preamble waveform from a remaining set of preamble waveforms; and
a transmitter apparatus coupled and responsive to the signal source to transmit to another mobile unit in an asynchronous communication system at least one among the set of preamble waveforms made distinguishable based on an association with a call type and a target identifier.

18. A wireless receiver arranged to detect a preamble signal among a set of known preamble waveforms to exit a standby mode, the wireless receiver comprising:
a receiver for scanning, asynchronously and sequentially during a wakeup time, a plurality of communication resources;
a sampler, coupled to the receiver, for collecting a plurality of received sample sequences, one sample sequence collected at each of the plurality of communication resources; and
a controller coupled to the receiver and sampler, programmed to calculate, for each of the plurality of communication resources, a correlation between a received signal and an undistorted version of a transmitted preamble waveform, for every known preamble waveform within the set; and wherein a desired preamble signal is based on a call type and a receiver ID associated with the call type.

19. The wireless receiver of claim 18, wherein the controller is further programmed to reject the received signal if a ratio of an undesired-to-desired correlation exceeds a predetermined threshold, for any one of a set of undesired preambles.

20. The wireless receiver of claim 18, wherein the controller is further programmed to compute a measure of envelope variation for a received envelope.

21. The wireless receiver of claim 20, wherein the controller is further programmed to reject the received signal if a normalized correlation metric with a desired preamble signal falls below a predetermined threshold while the received envelope is measured to be substantially constant having minor or no envelope variation.

22. The wireless receiver of claim 21, wherein the controller is further programmed to measure the envelope variation as a normalized variance.

23. The wireless receiver of claim 21, wherein the controller is further programmed to measure the envelope variation by computing the number of received envelope-squared samples which fall within a region, and wherein the region is formed as a function of an average power of the received samples.

24. The wireless receiver of claim 18, wherein the plurality of communication resources comprises a plurality of predetermined carrier frequencies.

* * * * *